(12) United States Patent
Norton et al.

(10) Patent No.: US 9,778,555 B2
(45) Date of Patent: *Oct. 3, 2017

(54) HIGH CONTRAST PROJECTION SCREEN WITH STRAY LIGHT REJECTION

(71) Applicant: X Development LLC, Mountain View, CA (US)

(72) Inventors: Adam E. Norton, Palo Alto, CA (US); Serge J. Bierhuizen, San Jose, CA (US); Andrei S. Kazmierski, Pleasanton, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,535

(22) Filed: Sep. 27, 2016

(65) Prior Publication Data

US 2017/0017145 A1 Jan. 19, 2017

Related U.S. Application Data (63) Continuation of application No. 14/750,799, filed on Jun. 25, 2015, now Pat. No. 9,519,206.

(51) Int. Cl.
*G03B 21/14* (2006.01)
*G03B 21/56* (2006.01)
(Continued)

(52) U.S. Cl.
CPC .......... *G03B 21/625* (2013.01); *G02B 3/005* (2013.01); *G02B 3/0056* (2013.01); *G02B 3/08* (2013.01);
(Continued)

(58) Field of Classification Search
CPC .... G03B 21/56; G03B 21/565; G03B 21/602; G03B 21/625
(Continued)

(56) References Cited

U.S. PATENT DOCUMENTS 5,563,738 A 10/1996 Vance
5,724,182 A 3/1998 Mitani et al.
(Continued)

FOREIGN PATENT DOCUMENTS

WO WO 2006/020583 A2 2/2006

OTHER PUBLICATIONS

Duparré, J. et al., "Novel Optics/Micro-Optics for Miniature Imaging Systems", Fraunhofer Institute for Applied Optics and Precision Engineering, SUSS MicroOptics SA (2006) 15 pages.
(Continued)

*Primary Examiner* — William C Dowling
(74) *Attorney, Agent, or Firm* — Christensen O'Connor Johnson Kindness PLLC (57) ABSTRACT

A multi-layer projection screen includes a stray light rejection layer and a lens array. The stray light rejection layer includes an array of pillar structures, wherein each pillar structure of the array of pillar structures includes an entrance aperture, an exit aperture, a pathway extending from the entrance aperture to the exit aperture, and a side wall surrounding the pathway. The lens array is optically aligned to the array of pillar structures. The stray light rejection layer blocks display light received from the lens array having an oblique trajectory that is greater than a threshold angle from a first trajectory.

24 Claims, 7 Drawing Sheets

(51) Int. Cl.
*G03B 21/625* (2014.01)
*G03B 21/20* (2006.01)
*G02B 5/00* (2006.01)
*G02B 3/00* (2006.01)
*G02B 5/02* (2006.01)
*G02B 3/08* (2006.01)
*G03B 21/602* (2014.01)
*G03B 21/00* (2006.01)
*G02B 27/00* (2006.01)
*G02B 27/30* (2006.01)

(52) U.S. Cl.
CPC ............ *G02B 5/003* (2013.01); *G02B 5/005* (2013.01); *G02B 5/021* (2013.01); *G02B 5/0278* (2013.01); *G02B 5/0294* (2013.01); *G02B 27/0018* (2013.01); *G02B 27/30* (2013.01); *G03B 21/006* (2013.01); *G03B 21/147* (2013.01); *G03B 21/208* (2013.01); *G03B 21/602* (2013.01)

(58) Field of Classification Search
USPC .................................................. 353/443–460
See application file for complete search history.

(56) References Cited

U.S. PATENT DOCUMENTS

| | | | |
|---|---|---|---|
| 6,417,966 B1* | 7/2002 | Moshrefzadeh | G03B 21/62 359/453 |
| 6,449,089 B1 | 9/2002 | Moshrefzadeh et al. | |
| 6,466,368 B1 | 10/2002 | Piepel et al. | |
| 6,469,830 B1 | 10/2002 | Dubin et al. | |
| 6,520,643 B1 | 2/2003 | Holman et al. | |
| 6,535,333 B1 | 3/2003 | Piepel et al. | |
| 6,636,355 B2 | 10/2003 | Moshrefzadeh et al. | |
| 6,754,005 B2 | 6/2004 | Goto et al. | |
| 6,765,720 B2 | 7/2004 | Morris et al. | |
| 6,829,086 B1 | 12/2004 | Gibilini | |
| 7,233,439 B2 | 6/2007 | Shimizu | |
| 7,443,583 B2 | 10/2008 | Yamauchi | |
| 7,453,635 B2 | 11/2008 | Yeo et al. | |
| 7,453,636 B2* | 11/2008 | Yeo | G02B 3/0031 359/453 |
| 7,515,357 B2* | 4/2009 | Segawa | B29D 11/00278 359/619 |
| 7,854,519 B2 | 12/2010 | Akiyama | |
| 7,980,716 B2 | 7/2011 | Hirata et al. | |
| 8,004,760 B2 | 8/2011 | Liu et al. | |
| 8,233,217 B2 | 7/2012 | Kindler et al. | |
| 8,369,012 B2 | 2/2013 | Hannington | |
| 9,013,790 B1 | 4/2015 | Kazmierski et al. | |
| 9,013,791 B2* | 4/2015 | Okumura | G03B 21/62 359/459 |
| 9,250,508 B1* | 2/2016 | Fu | G03B 21/62 |
| 2001/0040263 A1 | 11/2001 | Nakai | |
| 2002/0109916 A1 | 8/2002 | Moshrefzadeh | |
| 2003/0081153 A1* | 5/2003 | Kobayashi | G02F 1/133512 349/95 |
| 2003/0184993 A1 | 10/2003 | Yamada | |
| 2004/0233541 A1 | 11/2004 | Mori et al. | |
| 2005/0018287 A1 | 1/2005 | Miyata et al. | |
| 2005/0041287 A1 | 2/2005 | Goto | |
| 2005/0128582 A1* | 6/2005 | Gibilini | G03B 21/625 359/455 |
| 2005/0134965 A1* | 6/2005 | Poulsen | B29D 11/00278 359/619 |
| 2005/0200953 A1 | 9/2005 | Sekiguchi et al. | |
| 2006/0061861 A1 | 3/2006 | Munro et al. | |
| 2006/0087732 A1 | 4/2006 | Shinbo | |
| 2006/0139758 A1 | 6/2006 | Segawa et al. | |
| 2006/0209403 A1 | 9/2006 | Parusel et al. | |
| 2006/0268404 A1* | 11/2006 | Hyobu | G03B 21/625 359/456 |
| 2007/0115548 A1 | 5/2007 | Ebina et al. | |
| 2007/0159691 A1 | 7/2007 | Fukano et al. | |
| 2007/0171523 A1 | 7/2007 | Yoon | |
| 2009/0009861 A1* | 1/2009 | Hyobu | G02B 5/0242 359/456 |
| 2009/0091824 A1 | 4/2009 | Yamashita et al. | |
| 2010/0214196 A1 | 8/2010 | Browaeys | |
| 2010/0271721 A1 | 10/2010 | Gaides et al. | |
| 2011/0157887 A1 | 6/2011 | Jeong et al. | |
| 2012/0244910 A1 | 9/2012 | Hsu | |
| 2013/0076737 A1 | 3/2013 | Park et al. | |
| 2013/0300637 A1 | 11/2013 | Smits et al. | |
| 2015/0153023 A1 | 6/2015 | Jepsen et al. | |

OTHER PUBLICATIONS

Wolfe, C.R. et al., "Characterization of BlackScreen™ for Rear-Projection Television", Proc. of SPIE vol. 5002 (2003) Downloaded From: http://spiedigitallibrary.org/ on Nov. 19, 2013, pp. 97-105.

Morris, G.M. et al., "Engineered diffusers™ for display and illumination systems: Design, fabrication, and applications", www.RPCphotonics.com, downloaded from Internet prior to Jun. 12, 2014, 11 pages.

Sales, Tasso R.M. et al., "Light Tamers Engineered microlens arrays provide new control for display and lighting applications", Photonics Spectra, Reprinted from the Jun. 2004 issue of Photonics Spectra, 4 pages.

Vikuiti™, "Vikuiti™ Rear Projection Film", Vikuiti Display Enhancement 3M, Data sheet Oct. 2006, 3M Optical Systems Division, 6 pages.

Vikuiti™, "Vikuiti™ Rear Projection Display Screen", Vikuiti Projection Display Components 3M, 3M Optical Systems Division, downloaded from Internet prior to Jun. 12, 2014, 8 pages.

Norton, A.E. et al., "High Contrast Rear Projection Screen", U.S. Appl. No. 14/303,163, filed Jun. 12, 2014, whole document.

Fu, Belle et al., "Rear Projection Screen With Pin-Hole Concentrator Array", U.S. Appl. No. 14/543,616, filed Nov. 17, 2014, whole document.

PCT/US2016/030398—International Search Report and Written Opinion, dated Jul. 15, 2016, 11 pages.

* cited by examiner

FIG. 7

HIGH CONTRAST PROJECTION SCREEN WITH STRAY LIGHT REJECTION

CROSS REFERENCE TO RELATED APPLICATION

The present patent application is a continuation of U.S. application Ser. No. 14/750,799, filed on Jun. 25, 2015, the contents of which are hereby incorporated by reference.

TECHNICAL FIELD

This disclosure relates generally to the field of optics, and in particular but not exclusively, relates to display screens.

BACKGROUND INFORMATION

Conventional rear projection screens use a thin diffusing layer in the form of a matte screen. An image is projected onto the back of the diffusing layer, where it is diffused and scattered into the viewing environment. The diffusing layer provides an image surface and its diffusive nature serves to increase the viewing angles from which the image can be observed. In order to provide good image quality, it is desirable for these projection screens to provide high image contrast and sharp image quality.

Conventional rear projection screens often suffer from poor image contrast in well-lit rooms, at least in part, from the scattering of ambient light back into the viewing environment. This backscattered ambient light deleteriously affects the black levels, and therefore contrast, of the rear projection screen. Furthermore, conventional rear projection screens often suffer from reduced image sharpness or image blur due to stray light in the projection path preceding the image plane of the projection screen. Stray light (i.e., display light with sufficiently large non-normal angles) emitted from the display source at a given display pixel location should be prevented from entering the optical path reserved for an adjacent display pixel prior to the display light reaching the image plane.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system, and method of fabrication for a high contrast projection screen with stray light rejection are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
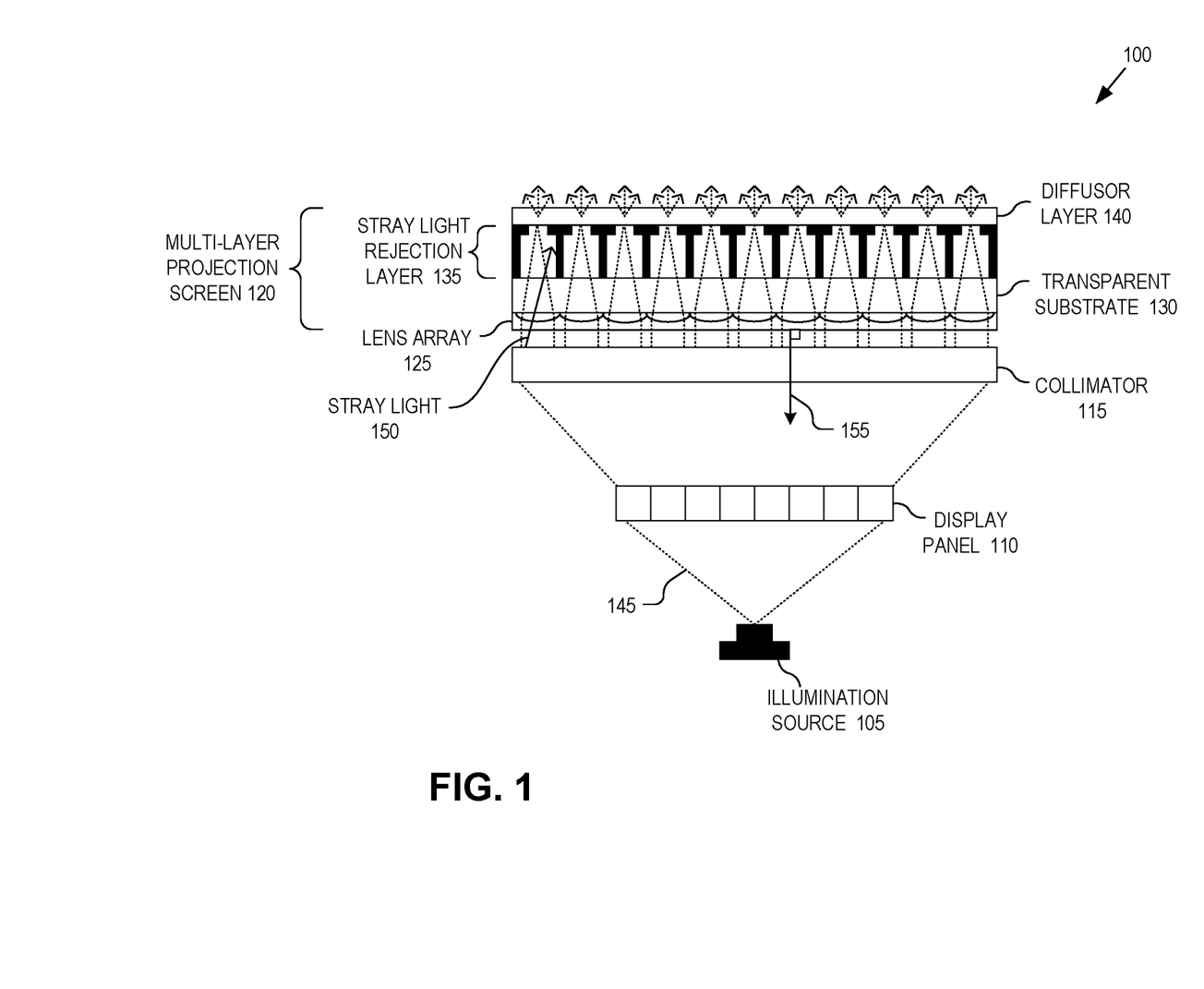
FIG. 1 is cross-sectional illustration of a rear projection display including a multi-layer projection screen that blocks stray light, in accordance with an embodiment of the disclosure.

FIG. 1 is cross-sectional illustration of a rear projection display 100 including a multi-layer projection screen that blocks stray light, in accordance with an embodiment of the disclosure. The illustrated embodiment of rear projection display 100 includes an illumination source 105, a display panel 110, a collimator 115, and a multi-layer projection screen 120. The illustrated embodiment of multi-layer projection screen 120 includes a lens array 125, a transparent substrate 130, a stray light rejection layer 135, and a diffuser layer 140.

During operation illumination source 105 emits display light 145 onto display panel 110. Illumination source 105 may be implemented using a variety of lamp technologies including light emitting diodes ("LED"), fluorescent lights, or otherwise. In the illustrated embodiment, illumination source 105 is a point source illuminator that generates divergent light. Of course, multi-layer projection screen 120 may be used with other types of illumination sources.

Display light 145 illuminates the backside of display panel 110, which spatially modulates an image onto display light 145. In the illustrated embodiment, display panel 110 is a transmissive pixel array, such as a liquid crystal display ("LCD"). Of course, other display panel technologies may be using including liquid crystal on silicon ("LCoS") panels, organic LED ("OLED") display panels, or otherwise. Although FIG. 1 illustrates display panel 110 in a rear illumination configuration, front illumination configuration may be implemented. Furthermore, direct emission panels (e.g., OLED) may be used, thus in these embodiments illumination source 105 would be integral with display panel 110. If alternative display technologies, such as OLED, LCoS, or direct microLED arrays are used, one or more additional optical layers may need to be introduced to control the angular spread of the emitted light.

In the illustrated embodiment, display light 145 output from display panel 110 is divergent. As such, collimator 115 is interposed between multi-layer projection screen 120 and display panel 110. Collimator 115 reduces the divergence of display light 145 such that it is substantially collimated along a trajectory that is near normal to a surface of transparent substrate 130. In practice, collimators (including collimator 115) are not 100% effective and thus some light remains divergent from scattered or diffracted light. Furthermore, display light incident near the periphery of display panel 110 or incident upon internal seams of any one of the components of rear projection display 100 may be refracted/reflected along non-normal trajectories. This light is referred to as "stray light" (e.g., stray light 150), which reduces the sharpness or fidelity of the image generated by rear projection display 100. For the purposes of this application, stray light 150 is defined as display light incident upon the backside of multi-layer projection screen 120 having an oblique trajectory that deviates more than a threshold angle from a normal 155 of transparent substrate 130 or other planar surfaces of multi-layer projection screen 120. In one embodiment, the threshold angle is approximately 5 degrees. Of course, in other embodiments, the threshold angle may be greater or smaller than 5 degrees.

Stray light 150 detracts from the image quality of rear projection display 100 since light output from a given display pixel of display panel 110 and intended for a given image pixel location on the projection screen could end up incident on the image pixel location associated with an adjacent display pixel. This scenario is deleterious to image quality. Accordingly, multi-layer projection screen 120 includes stray light rejection layer 135, which blocks stray light 150 from reaching diffuser layer 140 upon which the image plane for display light 145 is formed. Not only does multi-layer projection screen 120 reduce or block stray light 150, but it also serves to increase the display contrast of the projection screen by reducing ambient reflections.

The collimated display light 145 is incident upon lens array 125 after passing through collimator 115. Lens array 125 focuses display light 145 across transparent substrate 130, through transparent pathways between opaque side walls within stray light rejection layer 135, and onto diffuser layer 140. If portions of display light 145 have sufficiently oblique trajectories that exceed the threshold angle (e.g., stray light 150), these rays end up incident upon the opaque side walls and absorbed or blocked. In one embodiment, the opaque side walls are fabricated of a material having an index of refraction substantially similar to that of the transparent pathways to discourage total internal reflections of stray light 150 and encourage absorption of stray light 150.

As previously mentioned, diffuser layer 140 operates as the image plane for display light 145 and serves to increase the divergence of display light 145 emitted from the frontside of rear projection display 100 into the viewing environment. In other words, diffuser layer 140 increases acceptable viewing angles for rear projection display 100.

Not only does stray light rejection layer 135 improve image sharpness by reducing stray light 150 from one pixel entering into the optical path of an adjacent pixel, but stray light rejection layer 135 also serves to increase image contrast. In the illustrated embodiment, the opaque side walls surrounding the transparent pathways of each pillar structure are formed of a dark or black pigmented material (e.g., black polymer). As such the front side of stray light rejection layer 135 is perceived as a substantially black surface, which reduces back reflections of ambient light. To further reduce back reflection of ambient light, the surface area of the exit apertures of each pillar structure of stray light rejection layer 135 is smaller than its corresponding entrance aperture adjacent to transparent substrate 130. Various embodiments of stray light rejection layer 135 are discussed in greater detail in connection with FIGS. 4A-4C.

Figure 2:
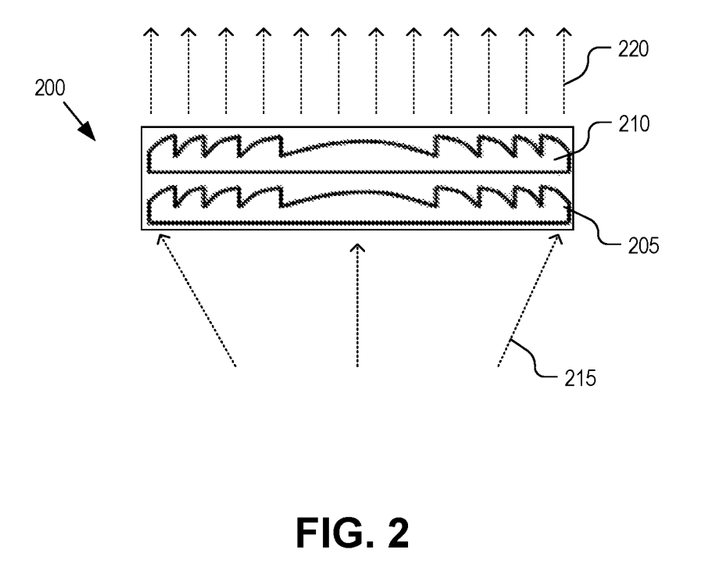
FIG. 2 is a cross-sectional illustration of a multi-stack Fresnel collimator, in accordance with an embodiment of the disclosure.

FIG. 2 is a cross-sectional illustrating of a multi-stack Fresnel collimator 200, in accordance with an embodiment of the disclosure. Fresnel collimator 200 is one possible implementation of collimator 115 illustrated in FIG. 1. The illustrated embodiment of Fresnel collimator 200 includes a first Fresnel collimator 205 and a second Fresnel collimator 210 stack there over. Each Fresnel collimator operates to reduce the divergence of display light 215 received from a display panel (e.g., display panel 110) in at least one dimension. For example, Fresnel collimators 205 and 210 may be orthogonally aligned to reduce the divergence of display light 215 in two orthogonal dimensional such that display light 220 is substantially collimated with a trajectory near normal (e.g., normal 155) to transparent substrate 130. In one embodiment, the majority of display light 220 has a less than 5 degree divergence from normal 155. However, in practice some display light 220 will end up refracted or reflected off trajectory as stray light 150. Stray light 150 may result from boundary interfaces, material flaws, or other inconsistencies in the design or manufacture of rear projection display 100.

Although FIG. 2 illustrates a dual stack of Fresnel collimators, in other embodiments, anywhere from one to many (e.g., four) layers of Fresnel collimators may be implemented. These Fresnel collimators may be linear, one dimensional collimators or circular, two dimensional collimators. In one embodiment, the multi-layer Fresnel collimator 200 may be bonded onto the backside of lens array 125. Other collimating optics may be used.

Figure 3A:
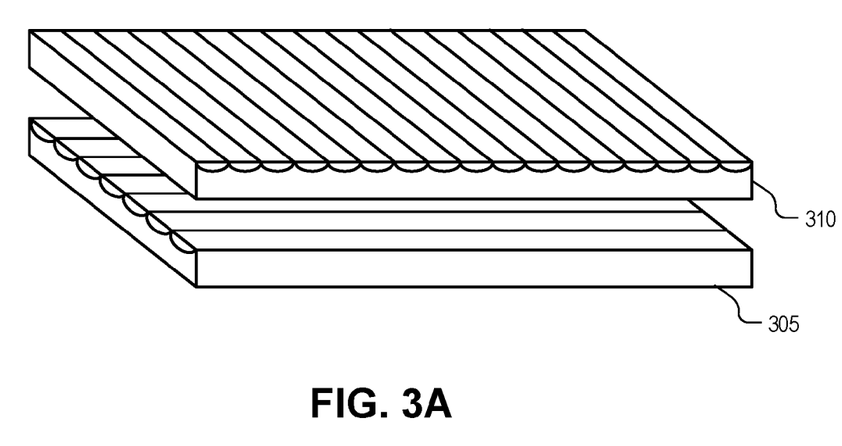
FIGS. 3A & 3B illustrate example lens arrays, in accordance with embodiments of the disclosure.
Figure 3B:
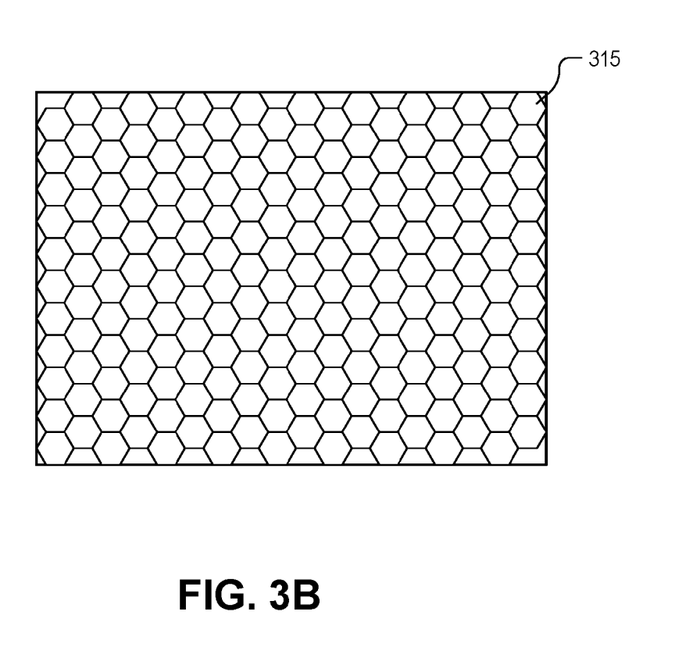

FIGS. 3A & 3B illustrate example lens arrays for implementing lens array 125, in accordance with various embodiments of the disclosure. For example, FIG. 3A illustrates a dual stack of one-dimensional ("1D") cylindrical lens arrays 305 and 310 having orthogonal orientations. Collectively, cylindrical lens arrays 305 and 310 focus near collimated display light 145 in two dimensions. FIG. 3B illustrates a 2D array of micro-lenses 315 that also focuses display light 145 in two dimensions. FIG. 3B illustrates a 2D array of hexagonal microlenses, but other lens shapes (e.g., circular microlenses) may also be used. Cylindrical lens array 305, 310 and mirco-lenses 315 may be fabricated from high index transparent plastic disposed across a low index transparent plastic sheet. Of course, other fabrication materials may be used.

Figure 4A:
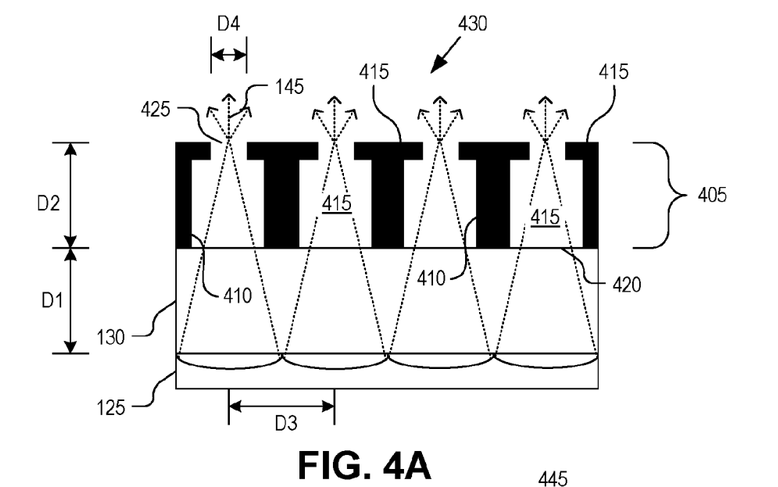
FIG. 4A is a cross-sectional illustration of a stray light rejection layer having opaque side walls with T-shaped cross-sections, in accordance with an embodiment of the disclosure.
Figure 4B:
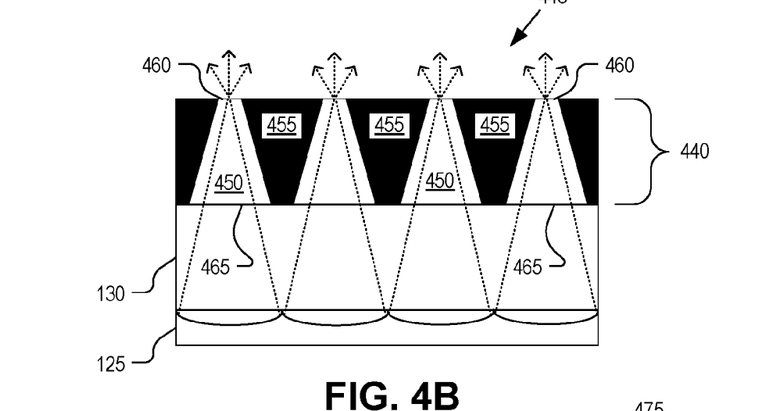
FIG. 4B is a cross-sectional illustration of a stray light rejection layer with transparent pathways having truncated cone cross-sections, in accordance with an embodiment of the disclosure.
Figure 4C:
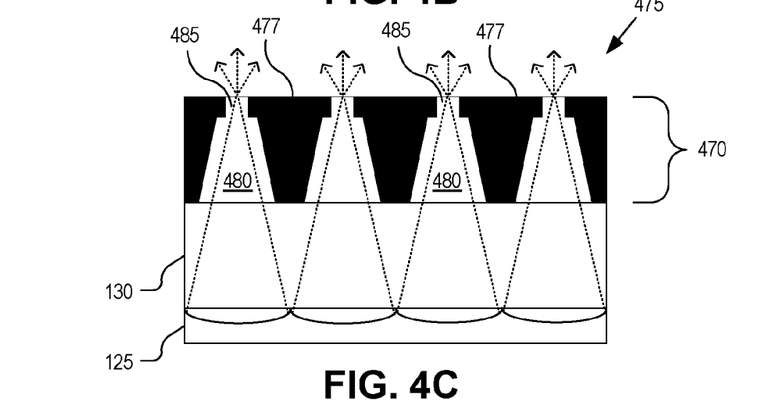
FIG. 4C is a cross-sectional illustration of a stray light rejection layer with transparent pathways having cross-sections resembling a truncated cone with a rectangular nipple, in accordance with an embodiment of the disclosure.

FIGS. 4A-4C illustrate various example implementations of stray light rejection layer 135 illustrated in FIG. 1. For example, FIG. 4A is a cross-sectional illustration of a stray light rejection layer 405 having opaque side walls 410 with T-shaped cross-sections, in accordance with a first embodiment of the disclosure. Opaque side walls 410 define transparent pathways 415 each having an entrance aperture 420 and an exit aperture 425. The opaque sides 410 and transparent pathways 415 together form a 2D array of pillar structures 430 that make up stray light rejection layer 405.

As illustrated, exit apertures 425 have a smaller cross-sectional area than entrance apertures 420. This provides room for display light 145 to converge into exit apertures 420 and provides a mostly dark surface for high contrast on the emission surface of stray light rejection layer 405. The embodiment illustrated in FIG. 4A may have the following demonstrative dimensions D1=50 to 100 um, D2=50 to 150 um, D3=40 to 100 um, D4=5 to 20 um. Of course, these dimensions are mere examples and other dimensions may be used.

FIG. 4B is a cross-sectional illustration of a stray light rejection layer 440 with a 2D array of pillar structures 445 formed by transparent pathways 450 and opaque sidewalls 455, in accordance with an embodiment of the disclosure. The illustrated transparent pathways 450 and opaque sidewalls 455 have cross-sectional shapes that resemble truncated cones and define exit apertures 460 that are smaller than their corresponding entrance apertures 465.

FIG. 4C is a cross-sectional illustration of a stray light rejection layer 470 with a 2D array of pillar structures 475, in accordance with anther embodiment of the disclosure. 2D array of pillar structures 475 are formed by transparent pathways and opaque side walls 477. The transparent pathways have cross-sections resembling a truncated cone section 480 adjacent an entrance aperture and a rectangular nipple section 485 adjacent to an exit aperture.

The 2D array of pillar structures illustrated in FIGS. 4A-C are merely representative and other cross-sectional shapes that provide smaller exit apertures than entrance apertures may be fabricated. A variety of different fabrication techniques may be used to form the stray light rejection layer on one side of transparent substrate 130 and lens array 125 on the other. In one embodiment, a rolling replication technique may be used where transparent substrate 130 (e.g., a sheet of Polyethylene terephthalate (PET) clear plastic) is fed under a rolling drum press. As transparent substrate 130 is fed under the drum press a transparent curable plastic is continuously dispensed over the surface of transparent substrate 130 in front of the drum press. The drum press then forms trenches corresponding to the opaque side walls of the 2D array of pillars into the transparent curable plastic. After UV or thermal curing of the molded transparent plastic, dark or black pigment is filled into the trenches, planarized (e.g., squeegeed), and cured.

Alternatively, lithographic techniques may be used to form the transparent pathways through stray light rejection layer 135. For example, light may be focused through lens array 125 to pattern transparent pathways through stray light rejection layer 135 using standard photolithography techniques. This technique benefits from passive self-alignment between lens arrays 125 and the transparent pathways of stray light rejection layer 135.

Figure 5A:
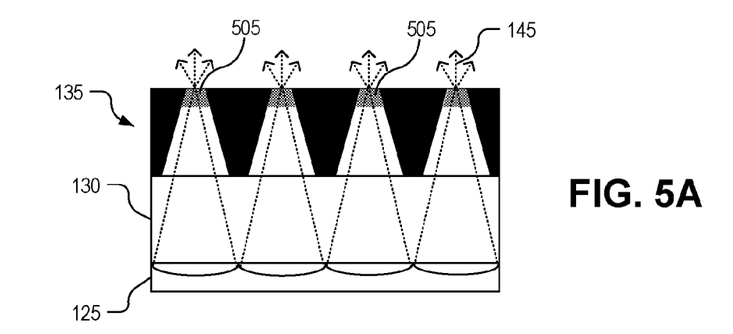
FIGS. 5A-5D illustrate example diffusers upon which an image plane for display light is formed, in accordance with embodiments of the disclosure.

FIGS. 5A-5D illustrate example implementations of diffuser layer 140 upon which an image plane for display light 145 is formed, in accordance with embodiments of the disclosure. FIG. 5A illustrates how diffusive material 505 is disposed within the transparent pathway proximate to the exit aperture of each pillar structure. Diffusive material 505 has a scattering effect on display light 145 causing the divergence of display light 145 to increase upon emission from the emission surface of stray light rejection layer 135. Diffusive material 505 may be implemented using a variety of techniques, such as embedding scattering particles within the transparent material of the transparent pathways. In one embodiment, the scattering particles may be transparent particles or beads having a different refractive index than the surrounding material of the transparent pathways. This embedded transparent particle technique reduces deleterious backscattering down the transparent pathways while increasing the divergence of the emitted display light 145.

Figure 5B:
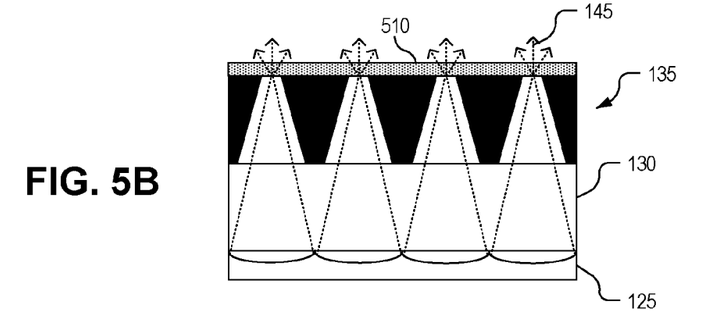
Figure 5C:
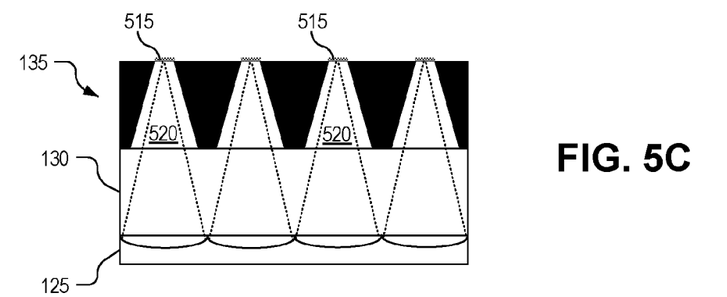
Figure 5D:
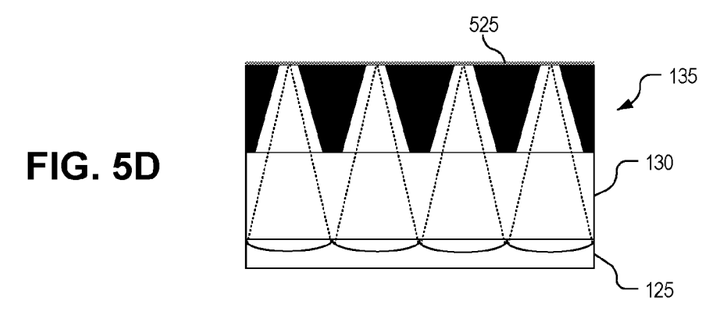

FIG. 5B illustrated an embodiment where a diffusive material layer 510 is disposed across the entire emission surface of stray light rejection layer 135. Diffusive material layer 510 may be fabricated using similar materials to diffusive material 505. FIG. 5C illustrates an embodiment where a texture 515 is formed into the emission surface of each transparent pathway 520. In one embodiment, texture 515 is the result of scoring, pressing, emblazoning, stamping, or otherwise roughing the surface of each transparent pathway 520. FIG. 5D illustrates an embodiment where a texture 525 is applied across the entire emission surface of stray light rejection layer 135. Diffusive material 505, diffusive material layer 510, textures 515, and texture 525 illustrate various structures for implementing diffuser layer 140. In various embodiments, one or more of the techniques illustrated in FIGS. 5A-D may be combined to improve the effectiveness of diffuser layer 140.

Figure 6:
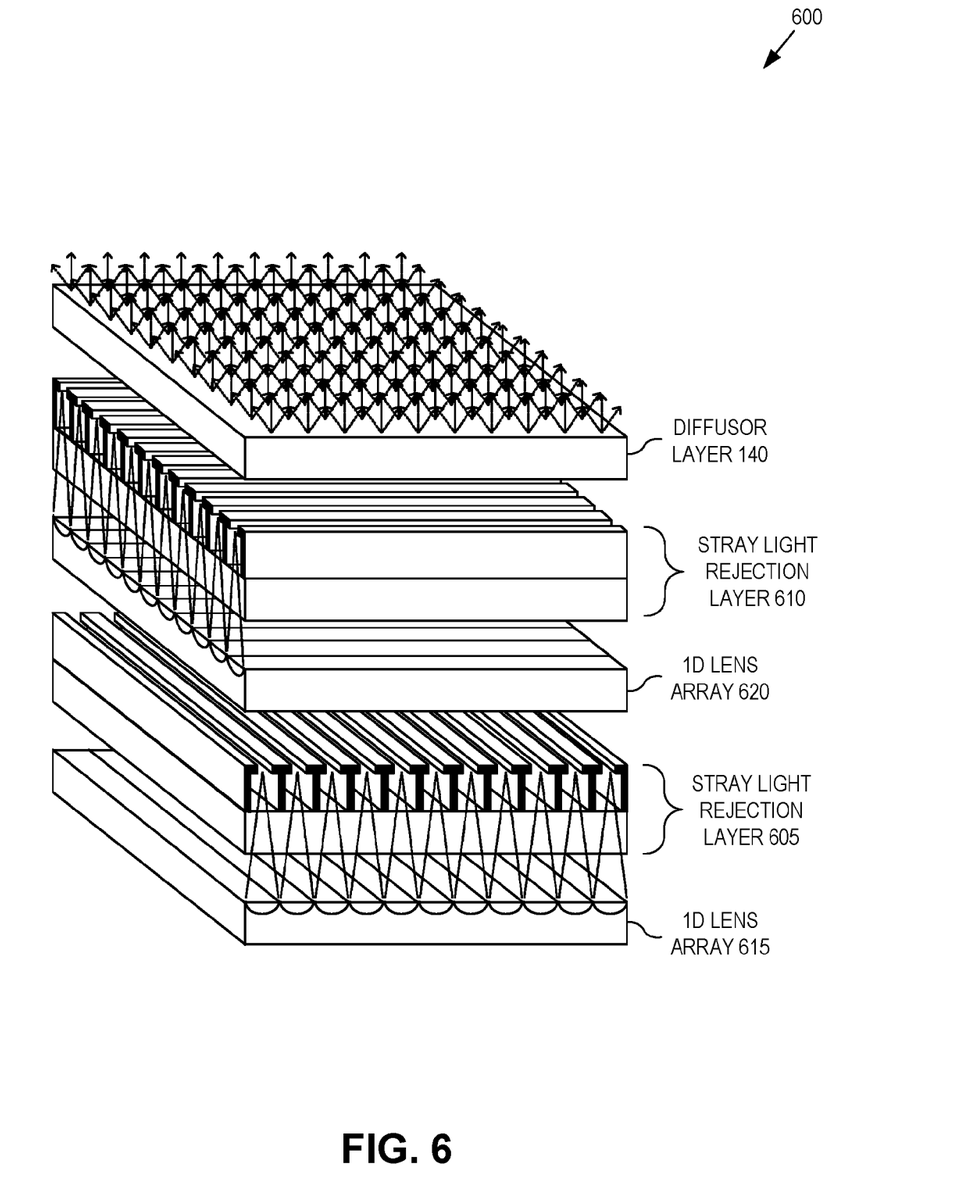
FIG. 6 is an exploded view illustration of a multi-layer projection screen that interleaves one-dimensional rejection layers with one-dimensional lens arrays, in accordance with an embodiment of the disclosure.

FIG. 6 is an exploded view illustration of a multi-layer projection screen 600 that interleaves one-dimensional stray light rejection layers with one-dimensional lens arrays, in accordance with an embodiment of the disclosure. Multi-layer projection screen 600 operates using the same principles as described above in connection with multi-layer projection screen 120, except that the functionality of stray light rejection layer 135 (FIG. 1) is separated into two stray light rejection layers 605 and 610 and the functionality of lens array 125 (FIG. 1) is separated into two non-adjacent 1D lens arrays 615 and 620. While stray light rejection layer 135 is formed as a 2D array of pillar structures that block stray light 150 in two dimensions, each stray light rejection layer 605 and 610 includes a 1D array of pillar structures that block stray light 150 along only a single dimension. However, the 1D array of pillar structures within stray light rejection layer 605 are orthogonally oriented relative to those in stray light rejection layer 610 such that collectively 2D blocking of stray light is achieved in a distributed manner. Similarly, 1D lens arrays 615 and 620 each focus light along a single dimension, but are also orthogonally oriented relative to each other. As illustrated in FIG. 6, 1D lens array 615 is aligned with stray light rejection layer 605 to focus the display light and block stray light along one dimension while 1D lens array 620 is aligned with stray light rejection layer 610 to focus the display light and block stray light in an orthogonal dimension. It should be appreciated that multi-layer projection screen 600 may be implemented using one-dimensional implementations of any of the pillar structures illustrated in FIGS. 4A-4C. Similarly, the diffuser layer 140 may be implemented using any of the structures illustrated in FIGS. 5A-5D, but applied to the top of stray light rejection layer 610, as illustrated in FIG. 6.

Figure 7:
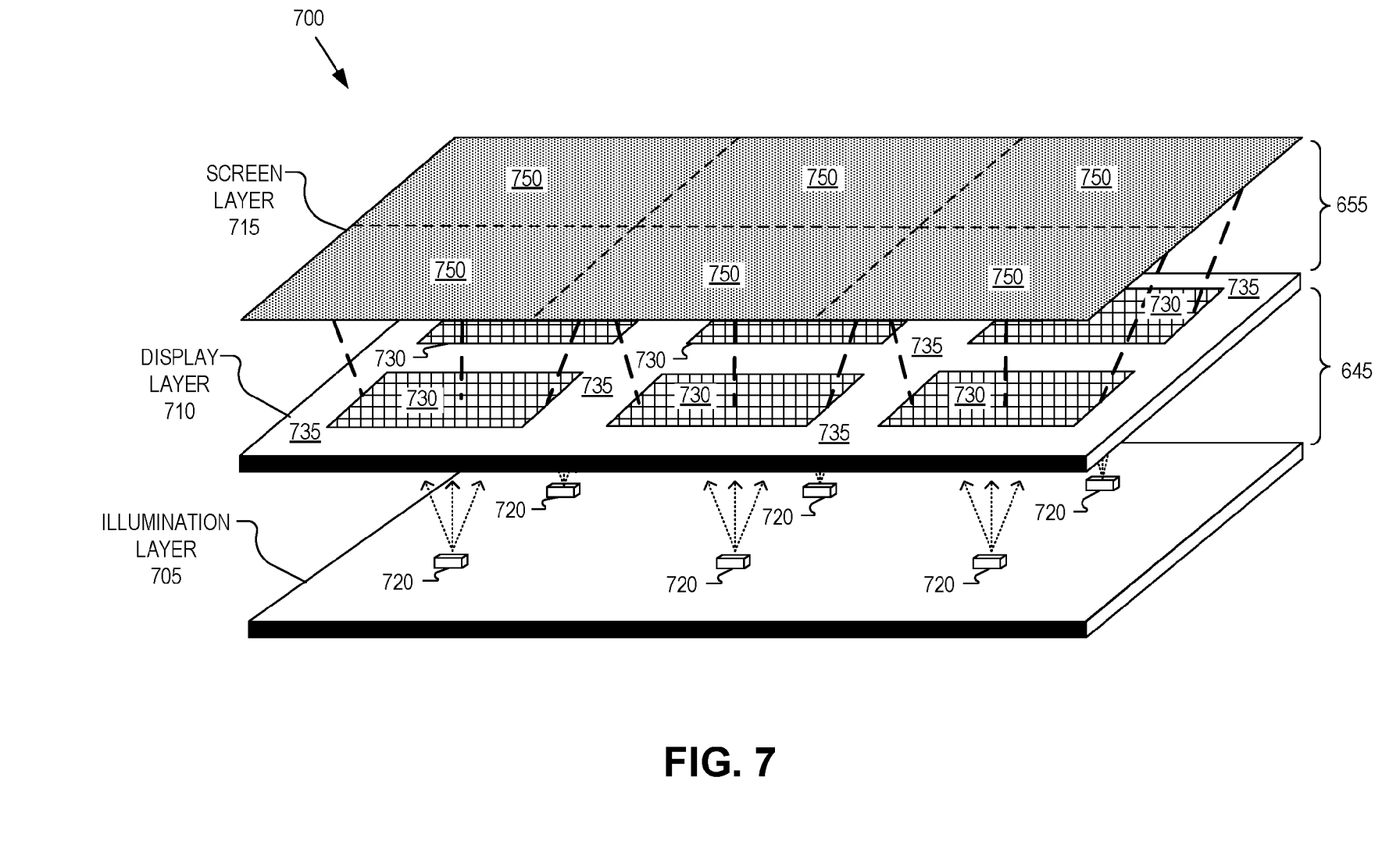
FIG. 7 is a perspective view illustrating functional layers of a rear projection display, in accordance with an embodiment of the disclosure.

FIG. 7 is a perspective view illustrating functional layers of an example rear projection display 700, in accordance with an embodiment of the disclosure. The illustrated embodiment of display 700 includes an illumination layer 705, a display layer 710, and a screen layer 715. Screen layer 715 may be implemented with any of the rear projection screens described above in connection with FIGS. 1-5, or various combinations thereof. It should be appreciated that the rear projection screens disclosed above may also be used in connection with other rear projection architectures as well.

The illustrated embodiment of illumination layer 705 includes an array of illumination sources 720. The illustrated embodiment of display layer 710 includes transmissive pixel arrays 730 separated from each other by spacing regions 735. The illustrated embodiment of screen layer 715 is divided into regions for displaying image portions 750 of an overall unified image. Rear projection display 700 is made up of a plurality of pixlets, each including an illumination source 720, transmissive pixel array 730, and a screen region for displaying an image portion 750 all aligned within a column through display 700.

In the illustrated embodiment, each illumination source 720 is aligned under a corresponding pixel array 730 to illuminate a backside of the corresponding pixel array with lamp light. Illumination sources 720 may be implemented as independent light sources (e.g., color or monochromatic LEDs, quantum dots, etc.) that emit light with a defined angular spread or cone to fully illuminate their corresponding transmissive pixel array 730 residing above on display layer 710. The illumination layer 705 and display layer 710 are separated from each other by a fixed distance 745 (e.g., 8 mm). This separation may be achieved using a transparent intermediary (e.g., glass or plastic layers) and may further include one or more lensing layers (including lenses, apertures, beam confiners, etc.) to control or manipulate the angular extent and cross-sectional shape of the lamp light emitted from illumination sources 720. In one embodiment, an illumination controller may be coupled to illumination sources 720 to control their illumination intensity. Illumination layer 705 may include a substrate upon which illumination sources 720 are disposed.

Transmissive pixel arrays 730 are disposed on the display layer 710 and each includes an array of transmissive pixels (e.g., 100 pixels by 100 pixels). In one embodiment, the transmissive pixels may be implemented as backlit liquid crystal pixels. Each transmissive pixel array 730 is an independent display array that is separated from adjacent transmissive pixel arrays 730 by spacing regions 735 on display layer 710. The internal spacing regions 735 that separate adjacent pixel arrays 730 from each other may be twice the width as the perimeter spacing regions 735 that separate a given pixel array 730 from an outer edge of display layer 710. In one embodiment, the internal spacing regions 735 have a width of 4 mm while the perimeter spacing regions 735 have a width of 2 mm. Of course, other dimensions may be implemented.

As illustrated, transmissive pixel arrays 730 are spaced across display layer 710 in a matrix with spacing regions 735 separating each transmissive pixel array 730. In one embodiment, transmissive pixel arrays 730 each represent a separate and independent array of display pixels (e.g., backlit LCD pixels). Spacing region 735 are significantly larger than the inter-pixel separation between pixels of a given transmissive pixel array 730. Spacing regions 735 provide improved flexibility for routing signal lines or the inclusion of additional circuitry, such as a display controller. Spacing regions 735 that reside along the exterior perimeter of display layer 710 also provide space for a bezel trim of display 700. The spacing regions 735 that reside along the exterior perimeter also provide space for power and/or communication ports.

Although FIG. 7 illustrates display layer 710 as including six transmissive pixel arrays 730 arranged into two rows and three columns, it should be appreciated that various implementations of display 700 may include more or less transmissive pixel arrays 730 organized into differing combinations of rows and columns. As such, in embodiments having a one-to-one ratio of illumination sources 720 to transmissive pixel arrays 730, the number and layout of illumination sources 720 on illumination layer 705 may also vary. While FIG. 7 does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, protective layers, or otherwise. Furthermore, screen layer 715 is illustrated for simplicity as a single layer projection screen; however, screen layer 715 may in fact be implemented using the multi-layer projection screen 120 illustrated in FIG. 1 or multi-layer projection screen 600 illustrated in FIG. 6. Furthermore, collimator 115 may be disposed between screen layer 715 and display layer 710. Display layer 710 represents one possible implementation of display panel 110 and illumination layer 705 illustrates one possible implementation of illumination source 105.

Transmissive pixel arrays 730 are switched under control of a display controller to modulate the lamp light and project image portions 750 onto a backside of screen layer 715. Image portions 750 collectively blend together on screen layer 715 to present a unified image to a viewer from the viewing side of screen layer 715 that is substantially without seams. In other words, the images created by transmissive pixel arrays 730 are magnified as they are projected across separation 755 (e.g., 2 mm) between display layer 710 and screen layer 715. The image portions 750 are magnified enough to extend over and cover spacing regions 735 forming a seamless unified image. The magnification factor is dependent upon separation 755 and the angular spread of the lamp light emitted by illumination sources 720. In one embodiment, image portions 750 are magnified by a factor of approximately 1.5. Not only does the unified image cover the internal spacing regions 735, but also covers the perimeter spacing regions 735. As such, display 700 may be positioned adjacent to other display tiles 700 and communicatively interlinked to form larger composite seamless displays, in which case the unified image generated by a single display tile becomes a sub-portion of a multi-tile unified image.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A multi-layer projection screen, comprising:
a stray light rejection layer including an array of pillar structures, wherein each pillar structure of the array of pillar structures includes:
an entrance aperture;
an exit aperture;
a pathway extending from the entrance aperture to the exit aperture; and
one or more side walls surrounding the pathway; and
a lens array optically aligned to the array of pillar structures such that each lens of the lens array focuses first display light having a first trajectory through the entrance and exit apertures of a corresponding pillar structure while second display light having an oblique trajectory that is greater than a threshold angle from the first trajectory is directed onto the side wall and substantially blocked from passing through the exit aperture, wherein the array of pillar structures further includes:
a plurality of trenches formed in a material layer that forms the pathway of each pillar structure;
dark ink filled into the plurality of trenches; and
a planarized top surface of the dark ink forming an emission surface of the stray light rejection layer.

2. The multi-layer projection screen of claim 1, wherein the one or more side walls and the pathway are formed of materials having substantially similar refractive indexes.

3. The multi-layer projection screen of claim 1, wherein the exit aperture has a smaller cross-sectional area than the entrance aperture.

4. The multi-layer projection screen of claim 3, wherein each of the one or more side walls separating adjacent pathways has a T-shaped cross-section.

5. The multi-layer projection screen of claim 3, wherein the pathway has a truncated cone shaped cross-section.

6. The multi-layer projection screen of claim 3, wherein the pathway has a cross-sectional shape comprising:
a truncated cone adjacent to the entrance aperture; and
a rectangular nipple adjacent to the exit aperture.

7. The multi-layer projection screen of claim 1, further comprising:
a diffuser disposed across the exit aperture of each pillar structure and upon which an image plane for the first display light is formed, wherein the diffuser increases a divergence of the first display light.

8. The multi-layer projection screen of claim 7, wherein the diffuser comprises one of:
a texture applied across an entire emission surface of the stray light rejection layer; or
a texture applied to the pathway at the exit aperture of each pillar structure of the array of pillar structures.

9. The multi-layer projection screen of claim 7, wherein the diffuser comprises one of:
a diffusive material layer disposed across an entire emission surface of the stray light rejection layer; or
diffusive material disposed within the pathway proximate to the exit aperture of each pillar structure of the array of pillar structures.

10. The multi-layer projection screen of claim 1, wherein the threshold angle is approximately 5 degrees.

11. The multi-layer projection screen of claim 1, wherein the lens array comprises a two-dimensional array of microlenses.

12. The multi-layer projection screen of claim 1, wherein the lens array comprises:
a first one dimensional ("1D") array of cylindrical lenses; and
a second 1D array of cylindrical lenses orthogonally oriented relative to the first 1D array of cylindrical lenses.

13. The multi-layer projection screen of claim 12, wherein the stray light rejection layer comprises a first stray light rejection layer and wherein the array of pillar structures comprises a first 1D array of pillar structures, the multi-layer projection screen further comprising:
a second stray light rejection layer including a second 1D array of pillar structures orthogonally oriented relative to the first 1D array of pillar structures,
wherein the second stray light rejection layer is interposed between the first and second 1D array of cylindrical lenses,
wherein the first 1D array of cylindrical lenses is aligned to the first 1D array of pillar structures of the first stray light rejection layer and the second 1D array of cylindrical lenses is aligned to the second 1D array of pillar structures of the second stray light rejection layer.

14. The multi-layer projection screen of claim 1, wherein the array of pillar structures comprises a two-dimensional array of pillar structures.

15. The multi-layer projection screen of claim 1, wherein the first trajectory is a trajectory incident upon the lens array that is parallel to a normal of the entrance aperture.

16. A rear projection display, comprising:
a projection screen including:
a stray light rejection layer including an array of pillar structures, wherein each pillar structure of the array of pillar structures includes an entrance aperture, an exit aperture, a pathway extending from the entrance aperture to the exit aperture, and a side wall surrounding the pathway; and
a lens array disposed across the stray light rejection layer and optically aligned to the array of pillar structures, wherein the stray light rejection layer blocks display light received from the lens array having an oblique trajectory incident upon the lens array that is greater than a threshold angle from a normal of the entrance aperture;
a display layer including a transmissive pixel array to project an image onto the projection screen;
an illumination layer including an illumination source to illuminate the transmissive pixel array; and
a Fresnel collimator disposed between the display layer and the lens array to reduce a divergence of the display light output from the transmissive pixel array.

17. The rear projection display of claim 16, wherein the side wall and transparent pathway are formed of materials having substantially similar refractive indexes.

18. The rear projection display of claim 16, wherein the exit aperture has a smaller cross-sectional area than the entrance aperture.

19. The rear projection display of claim 18, wherein each side wall separating adjacent pathways has a T-shaped cross-section.

20. The rear projection display of claim 18, wherein the pathway has a truncated cone shaped cross-section.

21. The rear projection display of claim 18, wherein the pathway has a cross-sectional shape comprising:
a truncated cone adjacent to the entrance aperture; and
a rectangular nipple adjacent to the exit aperture.

22. The rear projection display of claim 16, further comprising:
a diffuser disposed across the exit aperture of each pillar structure and upon which an image plane for the display light is formed, wherein the diffuser increases a divergence of the display light.

23. The rear projection display of claim 16, wherein the array of pillar structures further comprises:
a plurality of trenches formed in a material layer that forms the pathway of each pillar structure;
dark ink filled into the plurality of trenches; and
a planarized top surface of the dark ink forming an emission surface of the stray light rejection layer.

24. A multi-layer projection screen, comprising:
a stray light rejection layer including an array of pillar structures, wherein each pillar structure of the array of pillar structures includes:
an entrance aperture;
an exit aperture;

a pathway extending from the entrance aperture to the exit aperture; and
one or more side walls surrounding the pathway; and a lens array optically aligned to the array of pillar structures such that each lens of the lens array focuses first display light having a first trajectory through the entrance and exit apertures of a corresponding pillar structure while second display light having an oblique trajectory that is greater than a threshold angle from the first trajectory is directed onto the side wall and substantially blocked from passing through the exit aperture, wherein the one or more side walls and the pathway are formed of materials having substantially similar refractive indexes.

* * * * *